(12) United States Patent
Hilgeman

(10) Patent No.: US 12,743,282 B2
(45) Date of Patent: Sep. 22, 2026

(54) POWER SAVINGS DURING PARALLEL SYNCHRONIZATION FOR DISTRIBUTED MEMORY SYSTEMS BY USING DIFFERENT PROCESSOR STATES

(71) Applicant: DELL PRODUCTS L.P., Round Rock, TX (US)

(72) Inventor: Martin Hilgeman, Amstelveen (NL)

(73) Assignee: DELL PRODUCTS L.P., Round Rock, TX (US)

( * ) Notice: Subject to any disclaimer, the term of this patent is extended or adjusted under 35 U.S.C. 154(b) by 154 days.

(21) Appl. No.: 18/680,976

(22) Filed: May 31, 2024

(65) Prior Publication Data

US 2025/0370757 A1 Dec. 4, 2025

(51) Int. Cl.
*G06F 9/38* (2018.01)

(52) U.S. Cl.
CPC .......... *G06F 9/3885* (2013.01); *G06F 9/3869* (2013.01)

(58) Field of Classification Search
CPC ............................ G06F 9/3885; G06F 9/3869
See application file for complete search history.

(56) References Cited

U.S. PATENT DOCUMENTS 10,496,580 B1 * 12/2019 Lambert ................ H03M 9/00
2006/0259799 A1 * 11/2006 Melpignano .......... G06F 9/5088 713/300
2014/0089699 A1 * 3/2014 O'Connor ............. G09G 5/363 713/300
2015/0301573 A1 * 10/2015 Venkumahanti ...... G06F 1/3228 713/323
2015/0378419 A1 * 12/2015 Berghe ................. G06F 9/5094 713/320
2017/0285717 A1 * 10/2017 Bodas .................. G06F 1/3228

OTHER PUBLICATIONS

M Hilgeman, "MPI Power Savings, HPC Platform Efficiency and Power Savings for Large-scale Workloads," DELL Technologies 2023. (36 pgs).

* cited by examiner

*Primary Examiner* — Raymond N Phan
(74) *Attorney, Agent, or Firm* — BAUGH LAW, LLC

(57) ABSTRACT

Presented herein are embodiments that involve the CPU-intensive nature of parallel applications using message passing on multiple, distributed-memory server nodes. Power saving embodiments may be integrated into existing HPC (high-performance computing) applications using a message passing interface, which may be implemented using a software library. Tested embodiments showed savings of up to 17% of power consumption at the expense of a small performance penalty. In at least one case, an actual performance improvement was seen. It shall be noted that embodiments are not limited to parallel HPC workloads. One or more embodiments may be extended to every workload where either load imbalance or wait time for external data is involved, like shared storage systems, and distributed network operations for artificial intelligence/machine learning workloads.

20 Claims, 15 Drawing Sheets

700

POWER SAVINGS DURING PARALLEL SYNCHRONIZATION FOR DISTRIBUTED MEMORY SYSTEMS BY USING DIFFERENT PROCESSOR STATES

COPYRIGHT NOTICE

A portion of the disclosure of this patent document contains material that is subject to copyright protection. The copyright owner has no objection to the facsimile reproduction by anyone of the patent document, as it appears in the Patent and Trademark Office patent file or records, but otherwise reserves all copyright rights whatsoever.

BACKGROUND

A. Technical Field

The present disclosure relates generally to information handling systems. More particularly, the present disclosure relates to more efficiently using resources in distributed system environments.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An ever-increasing use of information handling systems—particularly given the dramatic increase in machine learning/artificial intelligence applications—is in the context of processing computationally intensive workloads. To accelerate the processing of intensive tasks, these compute-intensive workloads may be run on many concurrent central processing unit (CPU) cores, or multiple server nodes. One such implementation is High-Performance Computing (HPC).

HPC refers to the use of supercomputers and computer clusters to solve complex computational problems that require significant computational power. These problems often involve analyzing and processing large amounts of data or executing complex simulations.

HPC systems typically comprise multiple interconnected computers working together in parallel to perform computations. They are optimized for tasks such as weather forecasting, climate research, molecular modeling, financial modeling, and simulations in various scientific and engineering fields. Some key characteristics of HPC systems include parallelism, scalability, high-speed interconnections, specialized hardware, and distributed file systems. Concerning parallelism, HPC systems leverage parallel processing techniques to divide tasks among multiple processors or compute nodes, allowing for faster computation. Concerning scalability, HPC systems are designed to scale up to thousands or more of processing cores, enabling them to handle massive amounts of data and compute-intensive tasks efficiently. Concerning high-speed interconnects, HPC systems typically utilize high-speed networks or interconnects to enable fast communication between compute nodes, minimizing data transfer bottlenecks. Often, HPC systems may incorporate specialized hardware components such as accelerators (e.g., GPUs) or co-processors (e.g., field programmable gate arrays (FPGAs)) to further enhance computational performance for specific tasks. Finally, HPC systems typically use distributed file systems that enable efficient storage and access to large volumes of data across multiple nodes.

Compute intensive workloads that run on many concurrent CPU cores, or multiple server nodes, have mechanisms in place that take care of the data distribution, collection, and integrity when the data is scattered across multiple compute Processing Elements (PEs).

The applications that run on HPC clusters use a mechanism to feed that data into each independent memory domain of the server node. This technique is called Multiple Instruction, Multiple Data (MIMD). Most HPC applications that implement compute parallelism through MIMD are programmed with the Message Passing Interface (MPI) API. In MPI, data is exchanged between PEs as messages. A message typically contains, in addition to the data itself, information about the sending PE, the receiving PE, the type of data, and the operation that needs to be performed. Additionally, it may contain a message tag, which is used to track the completion of the message transfer.

Messages between PEs on different server nodes are usually sent over a network like Ethernet, Infiniband, or other proprietary high-bandwidth, low-latency networks, like Cornelis Omni-path, and HPE's Slingshot. Implementations of the MPI standard typically use a polling mechanism, which continuously queries the server node's network card to determine whether there is any incoming data that needs to be processed. This polling is also used to ensure the completion (e.g., delivery) of a message at the remote destination. Polling and message completion are usually implemented through system calls that are defined in the POSIX standard. POSIX (Portable Operating System Interface) is a family of standards specifying the application programming interface (API) for software compatibility in Unix and Unix-like operating systems. Message completion is often performed by a progress engine in the software library that implements the MPI standard, which tracks more advanced, single-sided data distribution. Both data completion mechanisms are very compute intensive, where the CPU cores show full load during this task. In other words, the CPU cores are consuming a lot of power while doing no actual data movement or computational tasks.

Accordingly, it is highly desirable to find new, more efficient ways to coordinate usage or power consumption of PEs in a distributed environment.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
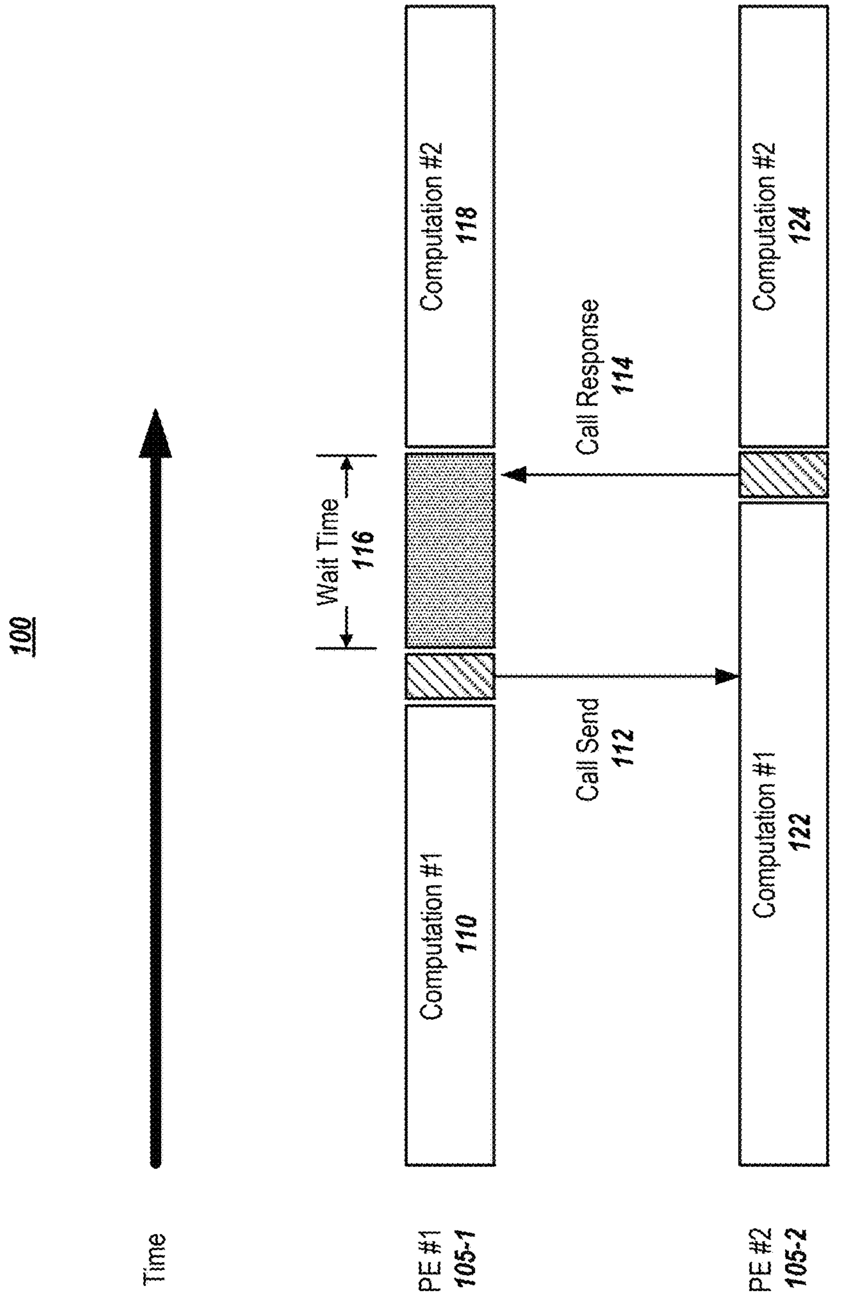
FIG. 1 ("FIG. 1") depicts a scenario in which there is load imbalance between different processing elements (PEs) because of a different amount of computation per PE.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of parallel computing environments, aspects of the present disclosure are not so limited. Accordingly, the aspects of the present disclosure may be applied or adapted for use in other contexts.

A. General Introduction

As noted above, compute intensive workloads that run on many concurrent CPU cores, or multiple server nodes, have mechanisms in place that take care of the data distribution, collection, and integrity when the data is scattered across multiple compute Processing Elements (PEs).

Techniques, like Multiple Instruction, Multiple Data (MIMD), run on HPC clusters to feed data into each independent memory domain of the server node. Most HPC applications that implement compute parallelism through MIMD are programmed with the Message Passing Interface (MPI) API. In MPI, data is exchanged between PEs as messages. A message typically contains, in addition to the data itself, information about the sending PE, the receiving PE, the type of data, and the operation that is to be performed. Additionally, it may contain a message tag, which is used to track completion of the message transfer.

Messages between PEs on different server nodes are usually sent over a high-bandwidth, low-latency network. Implementations of the MPI standard typically use a polling mechanism, which continuously queries the server node's network card to determine whether there is any incoming data that needs to be processed. This polling is also used to ensure the completion (e.g., delivery) of a message at the remote destination. Polling and message completion are usually implemented through system calls that are defined in the POSIX standard.

Message completion is often performed by a progress engine in the software library that implements the MPI standard, which tracks more advanced, single-sided data distribution. Both data completion mechanisms are very compute intensive, where the CPU cores show full load during this task. In other words, the CPU cores are consuming a lot of power while doing no actual data movement or computational tasks.

Embodiments presented in this patent document describe techniques where the PE performing the message completion may be set to a lower power state for the duration of the completion. When the completion is finished, the PE may be reset from this low-power (e.g., C6 state) to a default state (e.g., C0 state).

In computer architecture, C-states (or CPU power states) refer to various operating states of a processor that are designed to conserve power when the CPU is idle or underutilized. These states are typically implemented in modern CPUs to improve energy efficiency and reduce power consumption. C-states are typically categorized based on the level of power savings and the time required to transition between states. The most common C-states may include:

C0 state (Active state): This is the normal operating state of the CPU when it is actively executing instructions. In the C0 state, the CPU is fully powered and executing tasks.

C1 state (Halt state): In the C1 state, the CPU is idle, but it is still powered on and able to quickly resume normal operation. This state is often referred to as the "halt" state or "idle" state. The CPU may quickly transition back to the active state when needed.

C2 state (Stop-Clock state): The C2 state involves deeper power savings compared to C1. In this state, the CPU may stop its internal clock, which reduces power consumption further. However, transitioning back to the active state from C2 may require more time compared to C1.

C3 state (Sleep state): The C3 state, also known as the "sleep" state or "deep sleep" state, involves even deeper power savings. In this state, the CPU typically reduces its voltage and frequency, and may also power down certain components that are not needed for basic operation. Resuming from C3 typically takes longer than from C1 or C2.

Deeper C-states (e.g., C4, etc.): Some CPUs support additional, deeper C-states beyond C3, which offer even greater power savings. These deeper states may involve more aggressive power management techniques, such as powering down additional components or reducing voltage to specific parts of the CPU.

A transition from the C0 state to a lower C-state may incur a significant latency, which may make such transitions less favored for dynamically tuning the power consumption of workloads.

Modern CPUs from Intel and AMD contain substates of the C0 state, called C0.1 or C0.2, which have far lower entry and exit latency than other C-states.

Additionally, a switch from C0 to C0.1 or C1 may be triggered by user-callable instructions, which do not require special privilege (contrary to switching to other C-states).

While the switch between C-states incurs an additional latency to the message transfer itself, it also yields a saving in power consumption due to the time spent in the lower C-state itself. The switch to a lower C-state may be accomplished through the Linux SysFS pseudo-file system, or through an x86_64 MWAIT instruction.

An additional virtue of embodiments of the present patent document is that while some cores are set to the lower C0.1 or C0.2-state, other cores in the same package may potentially utilize the extra headroom in available power budget to clock to a higher frequency, which will improve their performance.

Consider, by way of illustration, the scenario depicted in FIG. 1, where there is load imbalance between different PEs because of a different amount of computation per PE. Consider PE #1 105-1 and PE #2 105-2 are both working on the same calculation. PE #1 105-1 has less work to do during Computation #1 110 and sends a message 112 to PE #2 105-2 at the end of Computation #1 110. As PE #2 105-2 is still busy with its Computation #1 122, PE #1 must wait 116 for the completion of its message. Finally, when PE #2 is done, it sends the acknowledging receive message 114 to PE #1, and both may continue with Computation #2 118 (PE #1) and 124 (PE #2).

Figure 2:
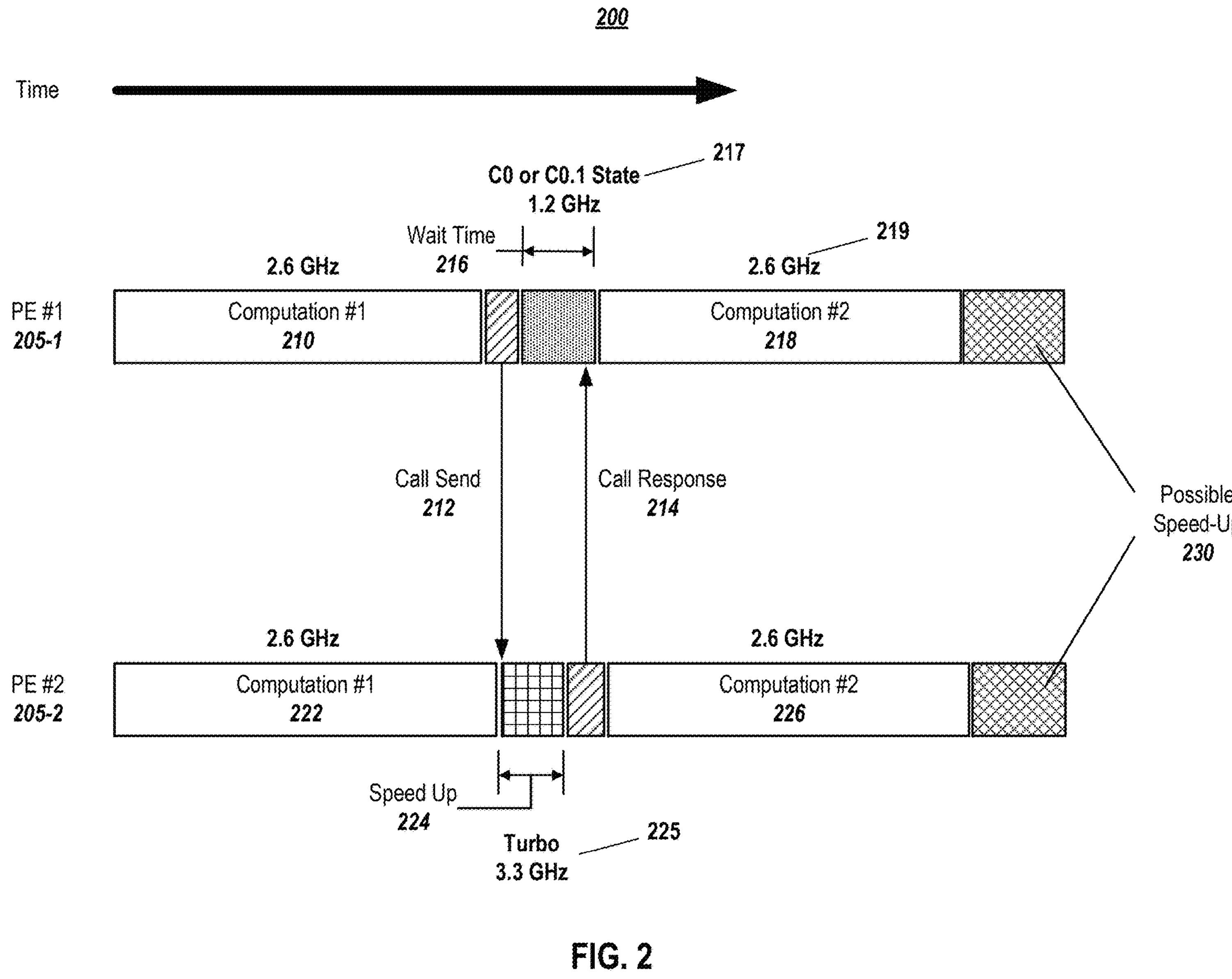
FIG. 2 depicts a similar scenario of load imbalance between different PEs as in FIG. 1, but with power switching enabled, according to embodiments of the present disclosure.

FIG. 2 depicts a similar scenario of load imbalance between different PEs as in FIG. 1, but with power switching enabled, according to embodiments of the present disclosure. In one or more embodiments, if C-state switching were to be enabled as part of the message transfer, the following scenario may be achieved. Note that PE #1 205-1 is finished earlier than PE #2 205-2 with its computation #1 210 and may enter a lower power-saving state (e.g., C0.1 state). PE #1 205-1 switches to a lower C-state 217 after it completes computation #1 210. The C-state switch 217 may be part of the MPI message transfer operation 212. Because of the extra current and thermal headroom available, PE #2 205-2 may switch to a higher P-state (effectively overclocking its frequency) 225 and may perform the remainder 224 of its computation #1 222 at a faster speed. Because PE #2 is able to increase its computations speed, the wait time 216 is reduced. In one or more embodiments, after the matching MPI receive operation 214, PE #1 205-1 may reset its C-state to a default state (e.g., C0) 219. Note that the more efficient use of the PEs results in possible speed-up 230 because PE #1 is waiting less time for PE #2 and PE #2 completes its computation #1 222 faster.

B. Embodiments for Power Savings

Embodiments of power state (e.g., C-state) switching, which enable power savings during data communication, may be achieved through a software library that intercepts an MPI function call by the application. The MPI standard defines a profiling interface (PMPI) that allows the creation of custom implementations by wrapping any of the standard MPI routines. A wrapper library may be generated that contains a subset of redefined MPI_* entry points, and inside those redefinitions, a combination of both MPI_* and PMPI_* symbols are called. This concept is illustrated graphically in FIG. 3.

Figure 3:
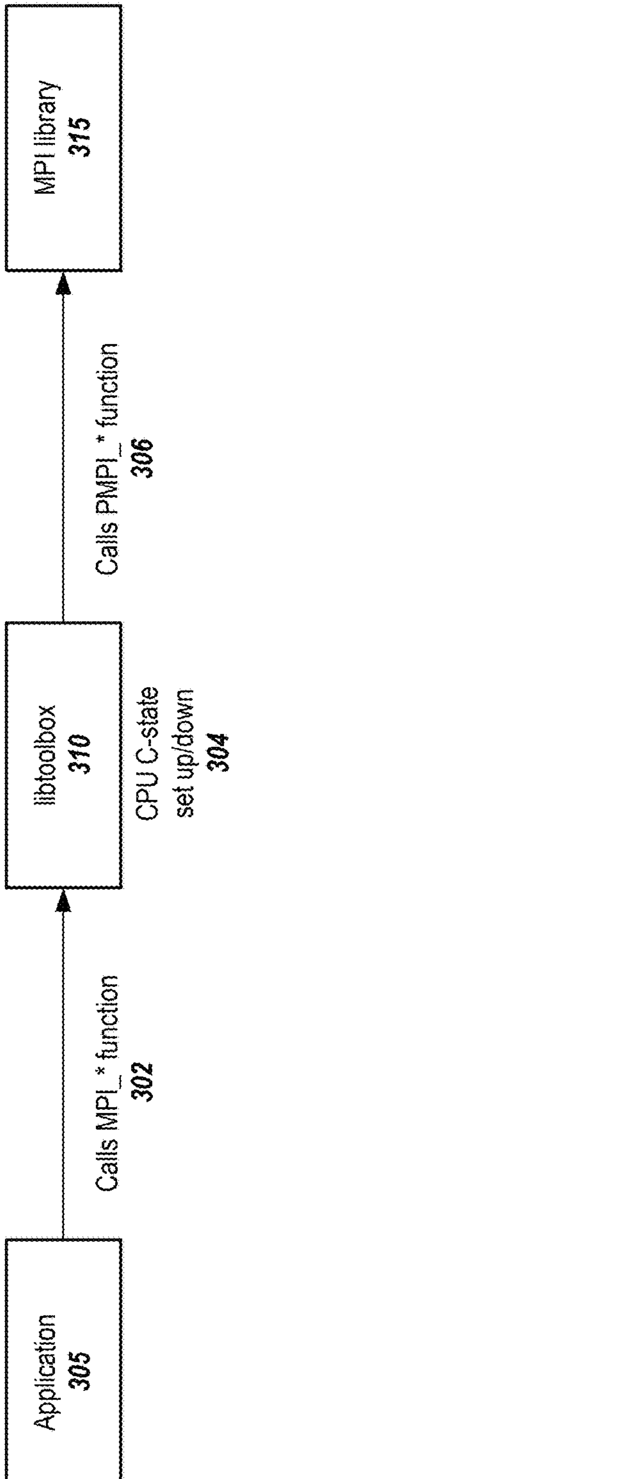
FIG. 3 depicts a call graph where a library called libtoolbox intercepts MPI calls from an application to convert it to a PMPI call to perform C-state switching, according to embodiments of the present disclosure.

Depicted in FIG. 3 is a call graph 300 where a library (libtoolbox 310) intercepts MPI calls 302 from an application 305 to convert it to a PMPI call 306 to perform C-state switching. Such embodiments allow one to write functions with the MPI_* prefix that call the equivalent PMPI_* function 306. Functions that are written in this manner behave like the standard MPI function but can also exhibit any other added behaviors, for example (by way of illustration and not limitation):

1. Inserting timers to measure the overhead of the MPI function.
2. Rewriting parts of the MPI function or even insert a specialized function.
3. Add functionality to the MPI function (embodiments herein do this).

Additionally, writing one's own functions that intercept the "real" MPI function has several advantages compared to a full rewrite or custom MPI library, including but not limited to:

1. The application does not need to be modified.
2. The source code of the application is not needed, it works with every binary executable.
3. Usage is transparent and non-intrusive: it can be implemented without having any visibility to the end-user.

The Linux runtime loader has a mechanism that allows pre-loading libraries that will be searched first for symbols before the standard paths are used. In combination with the MPI launcher this may function as follows:

% mpirun-np 1024-genv LD_PRELOAD=libtoolbox.so

Here, the mpirun command launches the application on 1024 cores, and the libtoolbox.so library is loaded first though setting the LD_PRELOAD environment variable. When an application for example calls the MPI_Recv( ) function to receive a message, then the symbol MPI_Recv is resolved in the libtoolbox.so library:

```
% nm -Bo libtoolbox-impi.so.1.0 | grep MPI_Recv
libtoolbox-impi.so.1.0:000000000000b490 T MPI_Recv
```

The function definition of MPI_Recv( ) then may look as follows in the libtoolbox library:

```
int MPI_Recv(void *buf, int count, MPI_Datatype datatype,
     int source, int tag, MPI_Comm comm, MPI_Status *status)
{
  ...
  set_cpu_freq(task.cpu);
  ret = PMPI_Recv(buf, count, datatype, source, tag, comm, status);
  reset_cpu_freq(task.cpu);
  return ret;
}
```

The functions "set_cpu_freq" and "reset_cpu_freq" use the Linux sysfs pseudo-filesystem to set the CPU core to the desired C-state. In one or more embodiments, for this to work, the power profile in the system BIOS may be set to "OS DBPM." OS DBPM refers to a power profile setting that involves monitoring the performance of various metrics such as CPU usage to ensure efficient operation. This implementation allows the operating system to manipulate processor frequencies.

1. Embodiments of CPU-Specific Extensions that Facilitate C-State Selection Both AMD and Intel have released extensions to the x86_64 instruction set architecture (ISA) that may be used to force the CPU into a lower C-state when it is waiting for an event to complete. This event, for example, may be an indicator—a signal or a write to a memory address that is being monitored. The use of the extension is effectively the same; it is the instruction that has slightly different semantics.

2. Intel: MONITOR/MWAIT & UMONITOR/UMWAIT Embodiments

Embodiments of handling the C-state transition may be through the x86_64 specific MWAIT instruction. An MWAIT instruction provides hints to allow the processor to enter an implementation-dependent optimized state. MWAIT accepts a hint and optional extension to the processor that it can enter a specified target C-state while waiting for an indicator (e.g., an event or a store operation to the address range armed by the MONITOR instruction). The use of MWAIT may be very useful in a scenario where there is load imbalance between different PEs, as illustrated in FIG. 1. A potential condition associated with MWAIT is that it may be limited to execute at certain privilege levels (e.g., at privilege level 0—use at any other privilege level may result in an invalid-opcode exception). The operating system or system BIOS may disable this instruction by using the IA32_MISC_ENABLE MSR.

To overcome the limitations of the MONITOR/MWAIT instruction, Intel has designed the UMONITOR/UMWAIT (User Level Monitor Wait) instructions, which may be used at any privilege level. UMONITOR/UMWAIT are supported in a number of micro-architectures. The UMWAIT instruction may be controlled through the IA32_UMWAIT_CONTROL register, where bit 0 sets the C-state and bits 2:31 set the spin time in Time-Stamp Counter (TSC) cycles. TSC is a feature used for performance monitoring, profiling, and timekeeping purposes, especially in systems where precise timing is required. TSC cycles may be used to measure the elapsed time between events or to benchmark the performance of various operations.

| Bit | C-state |
|---|---|
| Bit[0] = 0 | C0.2 |
| Bit[0] = 1 | C0.1 |
| Bit[31:2] | Maximum time in P0 TSC clock ticks that processor is in C0.2 or C0.1. Maximum value is $2^{30}$ (1073741824 cycles). |

The UMONITOR/UMWAIT instructions may be enabled by calling the _umonitor and _umwait intrinsic functions:

```
#include <immintrin.h>
#if defined ___WAITPKG___
void _umonitor (void *a)
unsigned char _umwait (unsigned int ctrl, unsigned ___int64 counter)
#endif
```

The instructions may be enabled when compiling with the -mwaitpkg GCC compiler flag.

3. AMD: MONITORX/MWAITX Embodiments

AMD has released a similar instruction pair called MONITORX/MWAITX, which forces a processor to wait for a store to a predefined memory location to occur. Similar to the Intel UMONITOR/UMWAIT instructions, it is supported on the user level. All AMD processors from the 15 h Family onward support the instructions. The instructions use two registers to define the C-state and the maximum wait time:

| Register | C-state |
|---|---|
| EAX[7:4] = 1 | C0 |
| EAX[7:4] = 0 | C1 |
| ECX[0] = 1 | Allow the CPU to wake up by an interrupt |
| ECX[1] = 1 | Maximum wait time in P0 TSC clock ticks that processor is in defined C-state. Time is set in ECX[31:2] |

The MONITORX/MWAITX instructions may be enabled by calling the _mm_monitorx and _mm_mwaitx or intrinsic functions:

```
#include <immintrin.h>
#if defined ___MWAITX___
  void _mm_monitorx (void *a, unsigned int, unsigned int);
  void _mm_mwaitx (unsigned int, unsigned int, unsigned int);
  void ___builtin_ia32_monitorx (void *a, unsigned int, unsigned
int);
  void ___builtin_ia32_mwaitx (unsigned int, unsigned int,
unsigned int);
  #endif
```

The instructions may be enabled when compiling with the -mmwaitx GCC compiler flag.

4. Embodiments of Obtaining Power Savings

Figure 4:
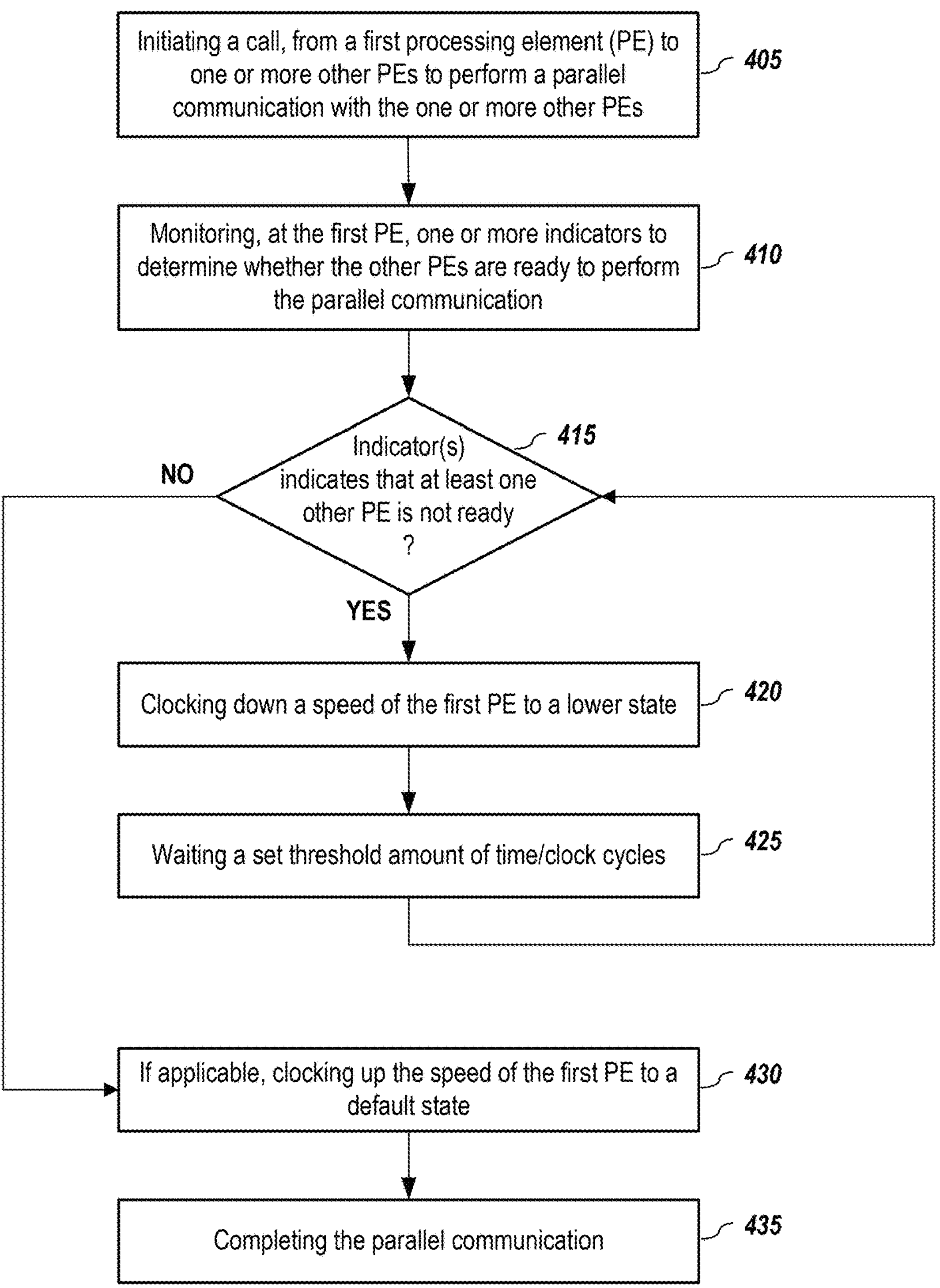
FIG. 4 depicts a methodology for making use of the potential power savings, according to embodiments of the present disclosure.

Embodiments may implement one or more methodologies that are the same as or similar to that depicted in FIG. 4 that obtain power savings.

FIG. 4 depicts a methodology for making use of the potential power savings, according to embodiments of the present disclosure. In one or more embodiments, a first processing element (PE) initiates (405) a call (or calls) to one or more other processing elements to perform a parallel communication with the other PE(s). The first PE may monitor (410) one or more indicators to determine whether the other PE(s) is/are ready to perform the parallel communication. In one or more embodiments, an indicator may be a value or a value change at a specific or specified memory address. It shall be noted that other indicators (such as a message, a state change, etc.) may be used.

If at least one other PE is not ready, the first PE may clock down (420) its speed to a lower state. In one or more embodiments, the first PE may wait (425) a threshold amount of time/clock cycles and then recheck the indicator (s). Alternatively, the first PE may continually check any pending indicators.

Responsive to the other PEs being ready, if applicable, the first PE may speed up its clock speed to a default state. Note that increasing the speed may not be required if, during the first loop through, the other PE(s) is/are ready. With all PEs ready, the parallel communication may then be performed (435). Examples of parallel communication may include but are not limited to performing a collective function, such as reduce, gather, scatter, bcast, allreduce, allgather, and alltoall.

Embodiments may make use of potential power savings by enabling the umwait/mwaitx instructions. Consider, by way of illustration and not limitation, the following example. At the start of an MPI_Allreduce wrapper function, a non-blocking MPI_Ibarrier call may be issued by a first PE. Being a non-blocking function, this immediately returns, and the request handle is saved to keep track of the completion of the function. All the MPI PEs that participate in the MPI_Allreduce call will have to complete this barrier first. When there is a load imbalance, and other MPI PEs have to wait on each other, this will give room for power savings.

In this example, UMONITOR/MONITORX is monitoring a store to the flag integer, which may be initialized to zero.

MPI_Test may be called to probe the completion of the request. When the MPI_Ibarrier has completed, a flag is toggled (e.g., toggled to 1).

When MPI_Ibarrier has not completed, the UMWAIT/MWAITX instruction may be called; the PE sleeps for some number of clock cycles (e.g., 100,000 clock cycles) in a lower C-state.

When all MPI ranks participating in the MPI_Allreduce call have completed the MPI_Ibarrier, the actual MPI_Allreduce function of the MPI library may be called.

Listed below are some example method flows:

```
int MPI_Allreduce(const void *sendbuf, void *recvbuf, int count,
        MPI_Datatype datatype, MPI_Op op, MPI_Comm comm)
{
  MPI_Request request;
  int flag = 0;
  /*
   * Issue a non-blocking barrier that we are going to probe
   * for its completion. This immediately returns.
   */
  PMPI_Ibarrier(comm, &request);
  /*
   * Define the memory address to wait to store for
   */
#if defined ___WAITPKG___
  _umonitor(&flag);
#elif defined ___MWAITX___
  _mm_monitorx(&flag, 0, 0);
#endif
  /*
   * Test the request from Ibarrier for its completion. This also
   * immediately returns. Flag=1 when request is completed.
   */
  while (!flag) {
    PMPI_Test(&request, &flag, MPI_STATUS_IGNORE);
#if defined ___WAITPKG___
  _umwait(0, mwait_cycles);
#elif defined ___MWAITX___
  _mm_mwaitx(MWAITX_C1, mwait_cycles,
  MWAITX_ECX_TIMER_ENABLE);
#endif
  usleep(mwait_time);
#endif
  }
  /*
   * Call the Allreduce and all ranks are aligned with each other.
   */
  ret = PMPI_ Allreduce(sendbuf, recvbuf, count, datatype, op, comm);
  return ret;
}
```

Figure 5:
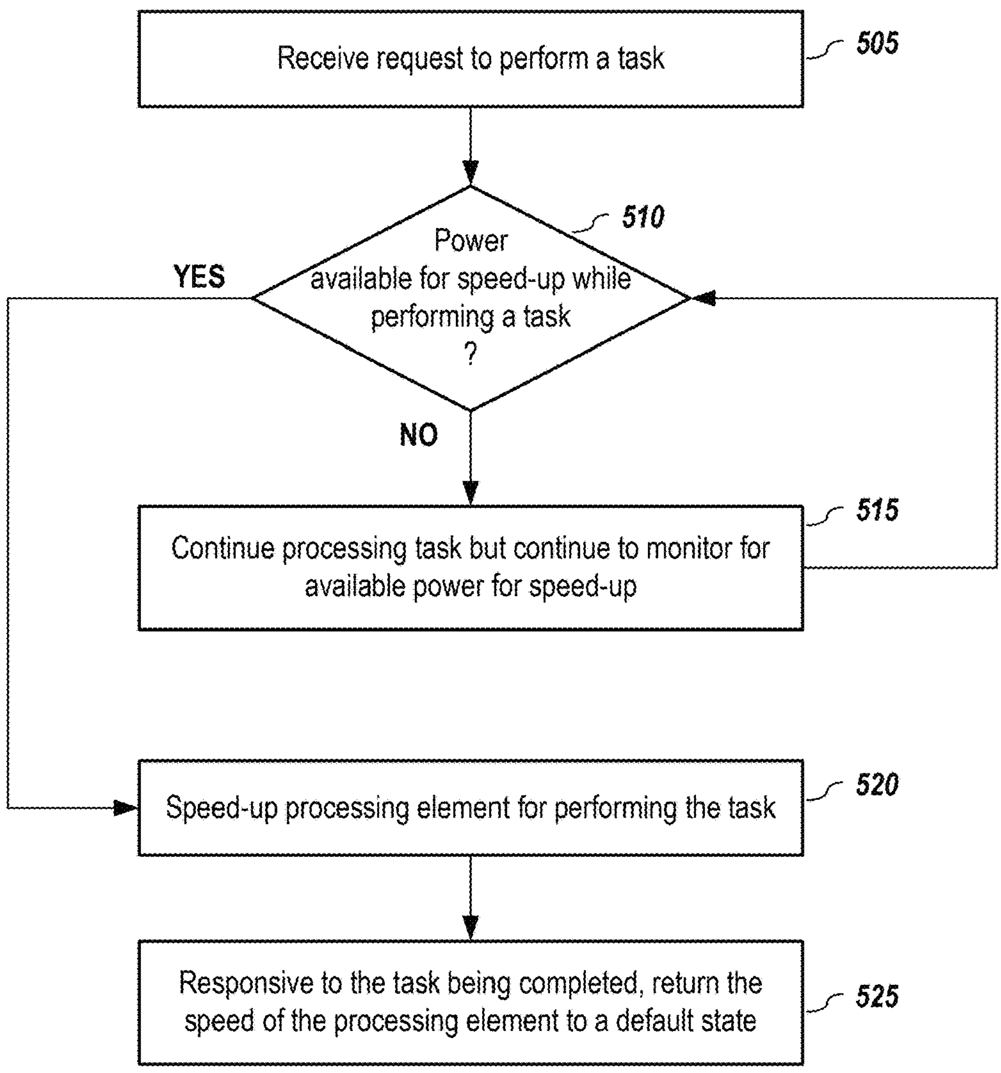
FIG. 5 depicts an example methodology that a processing element (PE) may perform, according to embodiments of the present disclosure.

FIG. 5 depicts an example methodology that a PE may perform, according to embodiments of the present disclosure. As illustrated, a PE may receive (505) a request to perform a task, which may be one that may require some form of collective/parallel communication action. While performing the action, the PE may check (510) whether resources (such as power) are available for it to increase its processing ability.

If not, the PE may continue processing the task at its current rate and periodically or continuously monitor (515) for available resources.

If resources are available for the PE to change its state to a higher processing state, it may increase its processing rate for that task. Responsive to the task being complete, the PE may return (525) its speed to a default rate.

Note that if the first and second PEs are on the same core/system, the reduction of speed of one may directly help make resources available for the other. However, it should also be noted that even if PEs are not on the same core/system, a PE may still also benefit. For example, if the PEs are utilizing an embodiment or embodiments of the present patent document, a PE of one core/system working on a task may benefit from another PE on the same core/system reducing its speed while it waits for another PE on a different system working on a different task. That is, if a number of PEs implement an embodiment, stochastic benefit will exist.

It shall be noted that the methodologies of FIG. 4 and FIG. 5 may be performed with two or more PEs (i.e., embodiments may include coordination between a number of PEs—on the same system or on different systems). A PE may monitor indicators for a number of PEs with whom it is coordinating. And, in one or more embodiments, so long as at least one of the PEs is still processing, that PE may remain in a lower C-state.

C. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

1. Power Savings Experiments

Figure 6:
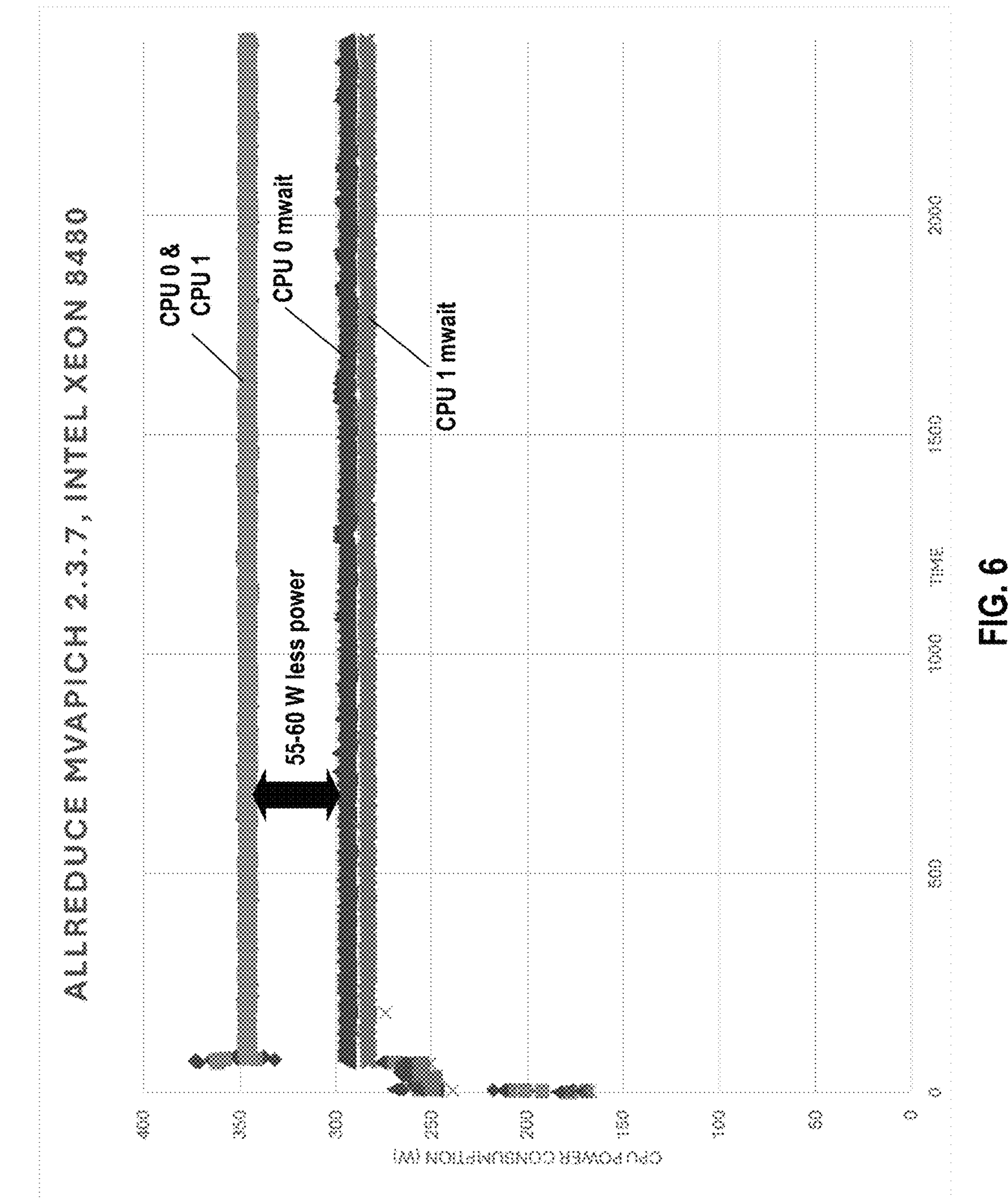
FIG. 6 depicts osu_allreduce power consumption (per CPU) for a cluster of 16 Intel Xeon 8480 nodes with NDR-400 NVIDIA Infiniband, according to embodiments of the present disclosure.

Initial testing was performed to investigate how much performance impact the C6-state itself has on the polling function, which queries the network card for incoming data. To investigate possible power savings on MPI polling functions, simulations were performed by inserting an artificial load imbalance into the osu_allreduce MPI latency test. With this, the power consumption of the MPI_Allreduce function itself may be examined. FIG. 6 depicts osu_allreduce power consumption (per CPU) for a cluster of 16 Intel Xeon 8480 nodes with NDR-400 NVIDIA Infiniband, according to embodiments of the present disclosure.

Figure 7:
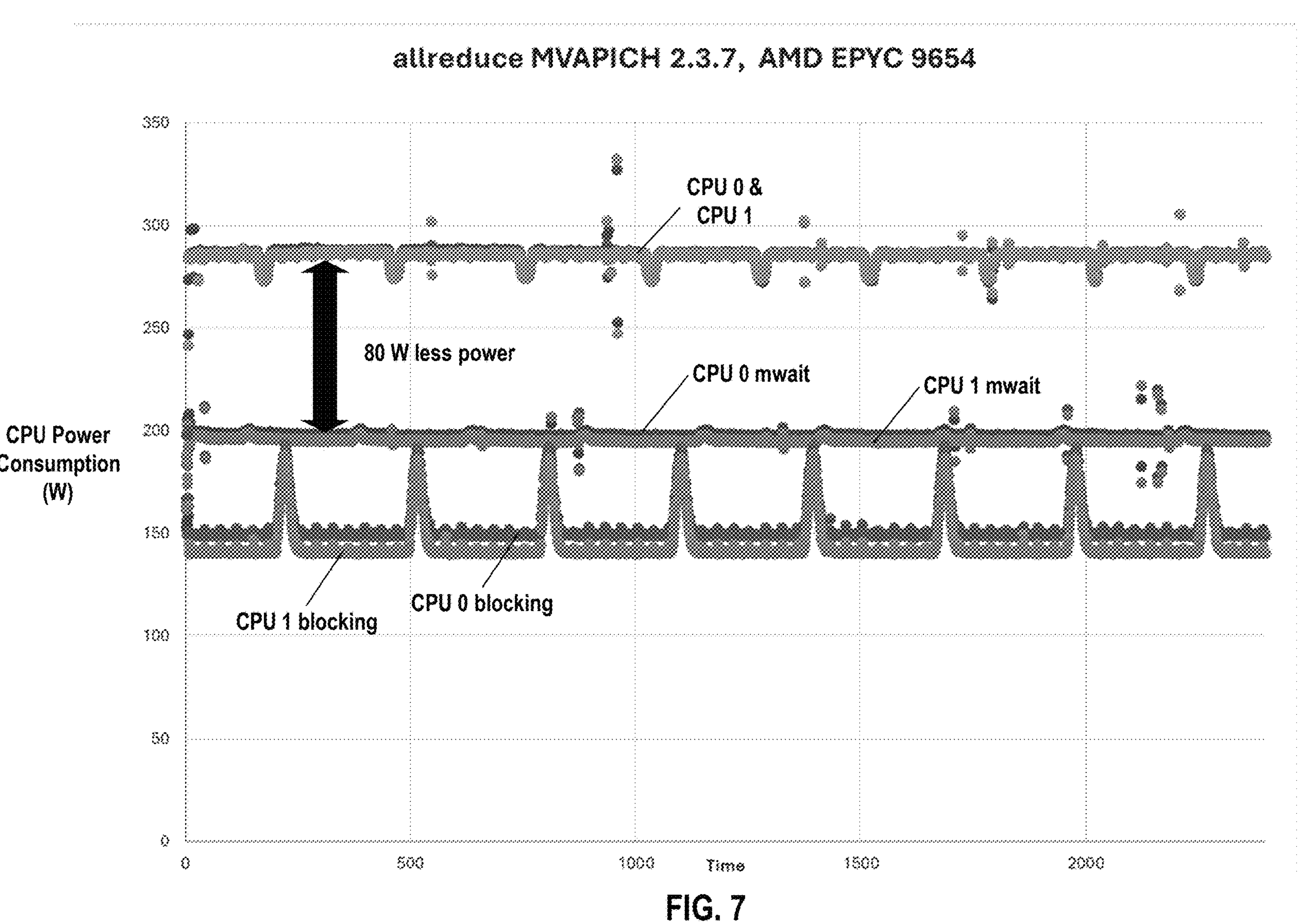
FIG. 7 depicts osu_allreduce power consumption (per CPU) for a cluster of 16 AMD EPYC 9654 with HDR-200 NVIDIA Infiniband, according to embodiments of the present disclosure.

A similar test was performed for a cluster of AMD EPYC 9654 processors. FIG. 7 depicts osu_allreduce power consumption (per CPU) for a cluster of 16 AMD EPYC 9654 with HDR-200 NVIDIA Infiniband, according to embodiments of the present disclosure.

The power savings when the umwait/mwaitx instructions are used are significant. One may achieve an even bigger power saving by enabling "blocking mode" in the MPI library itself, where the process goes to sleep and occasionally wakes up through an interrupt. However, the performance of this may be poor compared to the normal operation.

2. Polling Overhead Experiments

The use of the umwait/mwaitx instructions may introduce extra overhead. A first overhead may be the time that it takes to perform the C-state transition itself; the second overhead may be considered to be any performance penalty that occurs by running at lower power. One may measure this by performing the osu_allreduce benchmark on 2048 cores and comparing the latency with the latency measured for normal operation.

Figure 8:
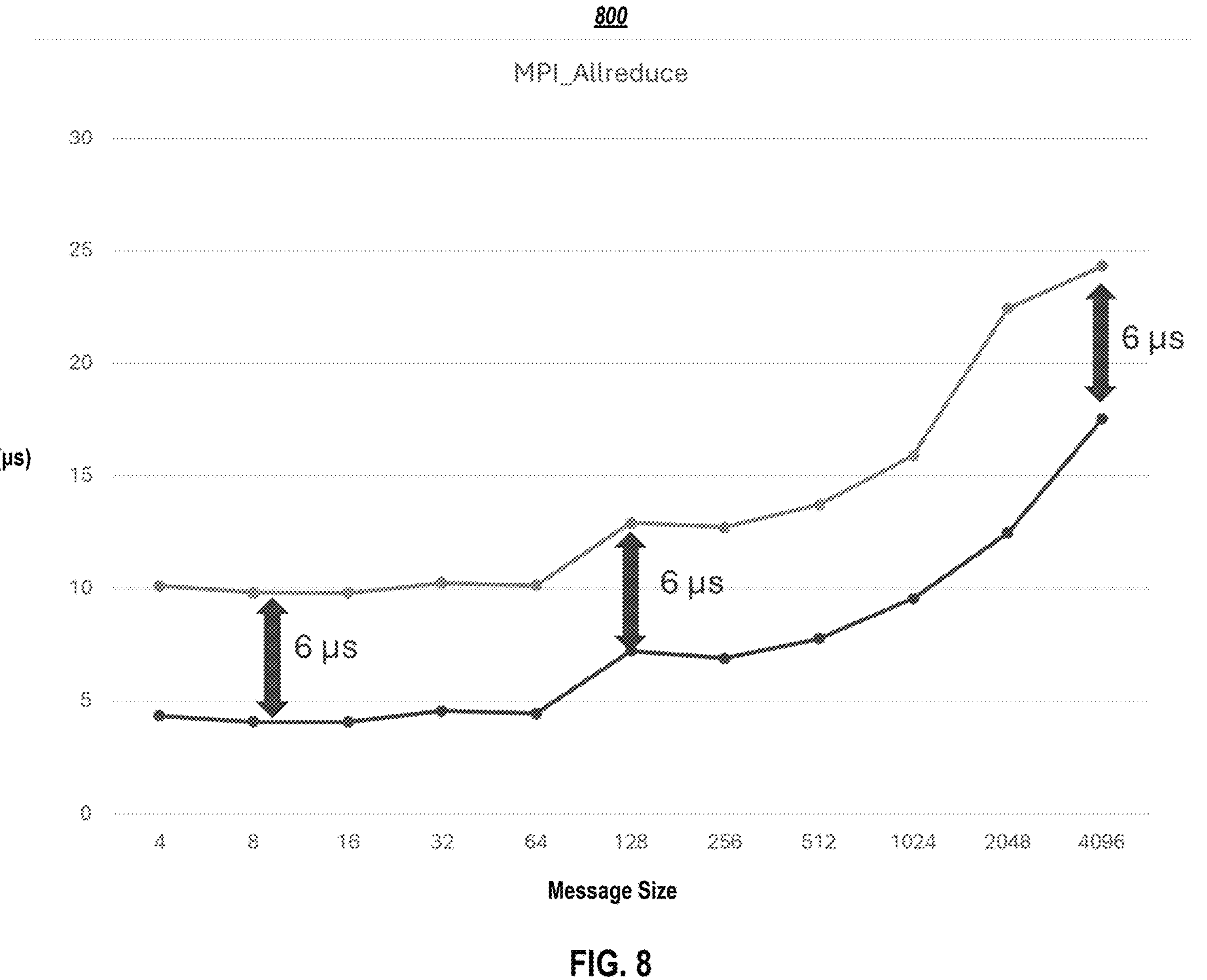
FIG. 8 depicts overhead of the Intel umwait instruction on an Intel Xeon 8480, for the osu_allreduce latency test, according to embodiments of the present disclosure.

FIG. 8 depicts overhead of the Intel umwait instruction on an Intel Xeon 8480, for the osu_allreduce latency test, according to embodiments of the present disclosure. One can see that there is a static 6 microsecond overhead. The measured 6 microsecond overhead is a static number and is independent of the message size (amount of data transferred per call). The overhead for small data sizes may be too high, except when there is a significant load imbalance. For larger message sizes (more than 16 kilobyte), the overhead was less than 5%.

3. Potential Network Performance Implications Experiments

A C-state switch may have implications for the performance of the MPI communication function, when the core is running at a lower power state. Interestingly enough, here is where the implementation of Intel and AMD differs. The Intel Xeon 8480 processor still maintained its nominal TDP frequency, while the AMD EPYC 9654 processor ran at a lower clock speed in its mwaitx induced C-state.

Figure 9:
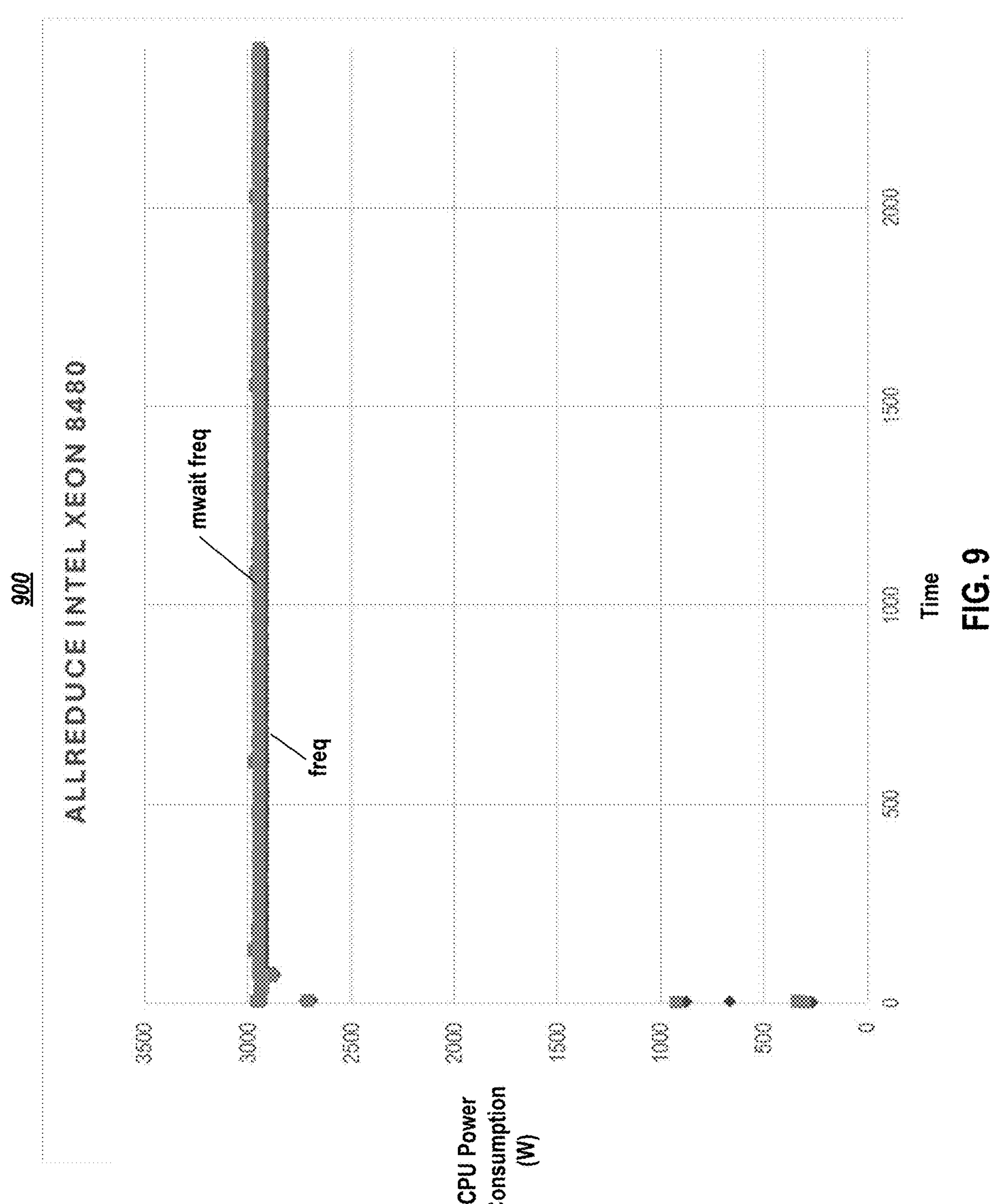
FIG. 9 depicts CPU frequency on an Intel Xeon 8480, for the osu_allreduce latency test, according to embodiments of the present disclosure.
Figure 10:
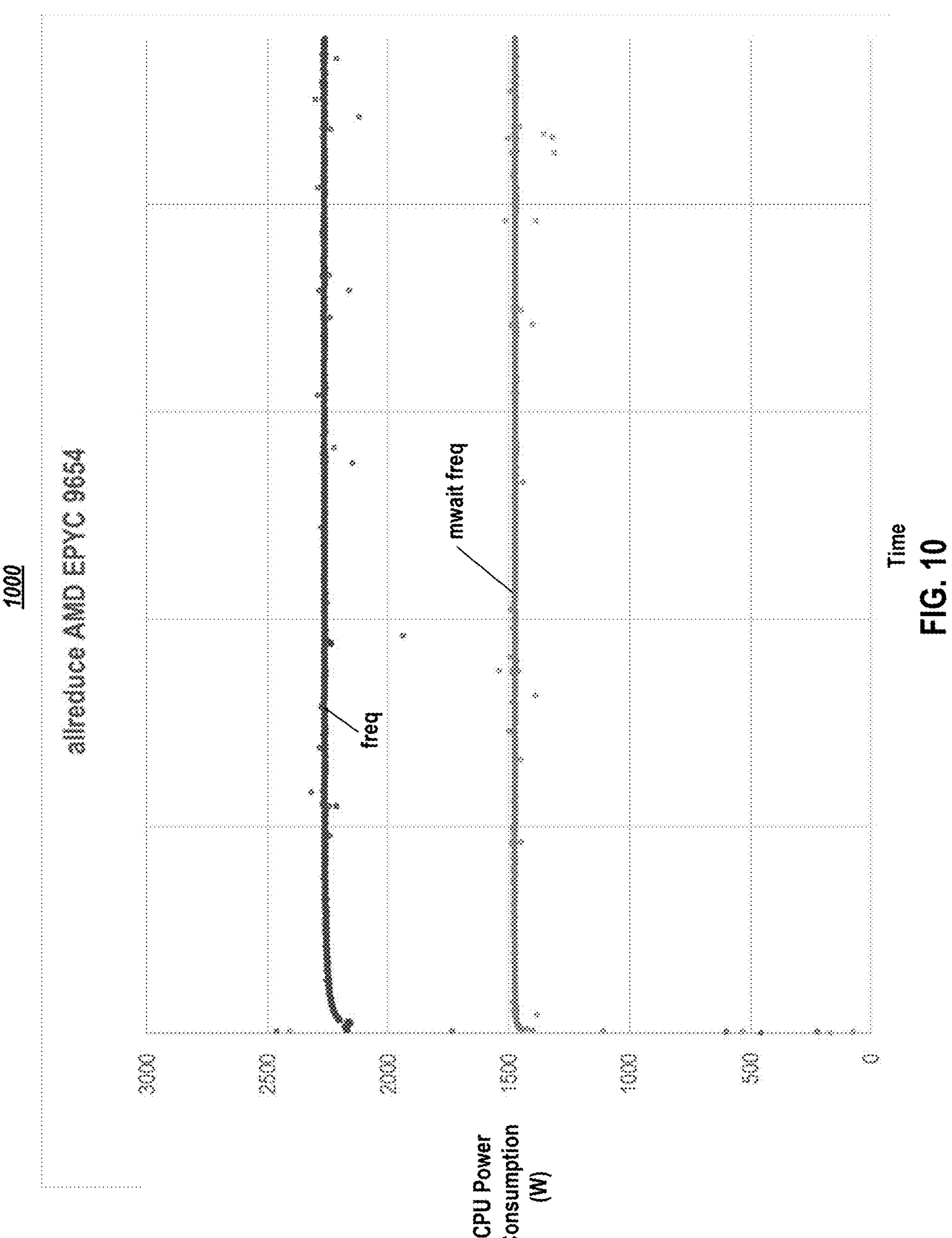
FIG. 10 depicts CPU frequency on an AMD EPYC 9654, for an allreduce latency test, according to embodiments of the present disclosure.

FIG. 9 depicts CPU frequency on an Intel Xeon 8480, for the osu_allreduce latency test, according to embodiments of the present disclosure. FIG. 10 depicts CPU frequency on an AMD EPYC 9654, for the osu_allreduce latency test, according to embodiments of the present disclosure.

Lastly, the time spent in a lower C-state was investigated. This may depend on the workload and the load imbalance present between the MPI ranks (i.e., PEs). In the case below, there is less than a millisecond time in umwait/mwaitx for MPI_Waitall, while it is almost 1/10th of a second for MPI_Allreduce. This may be significant.

Figure 11:
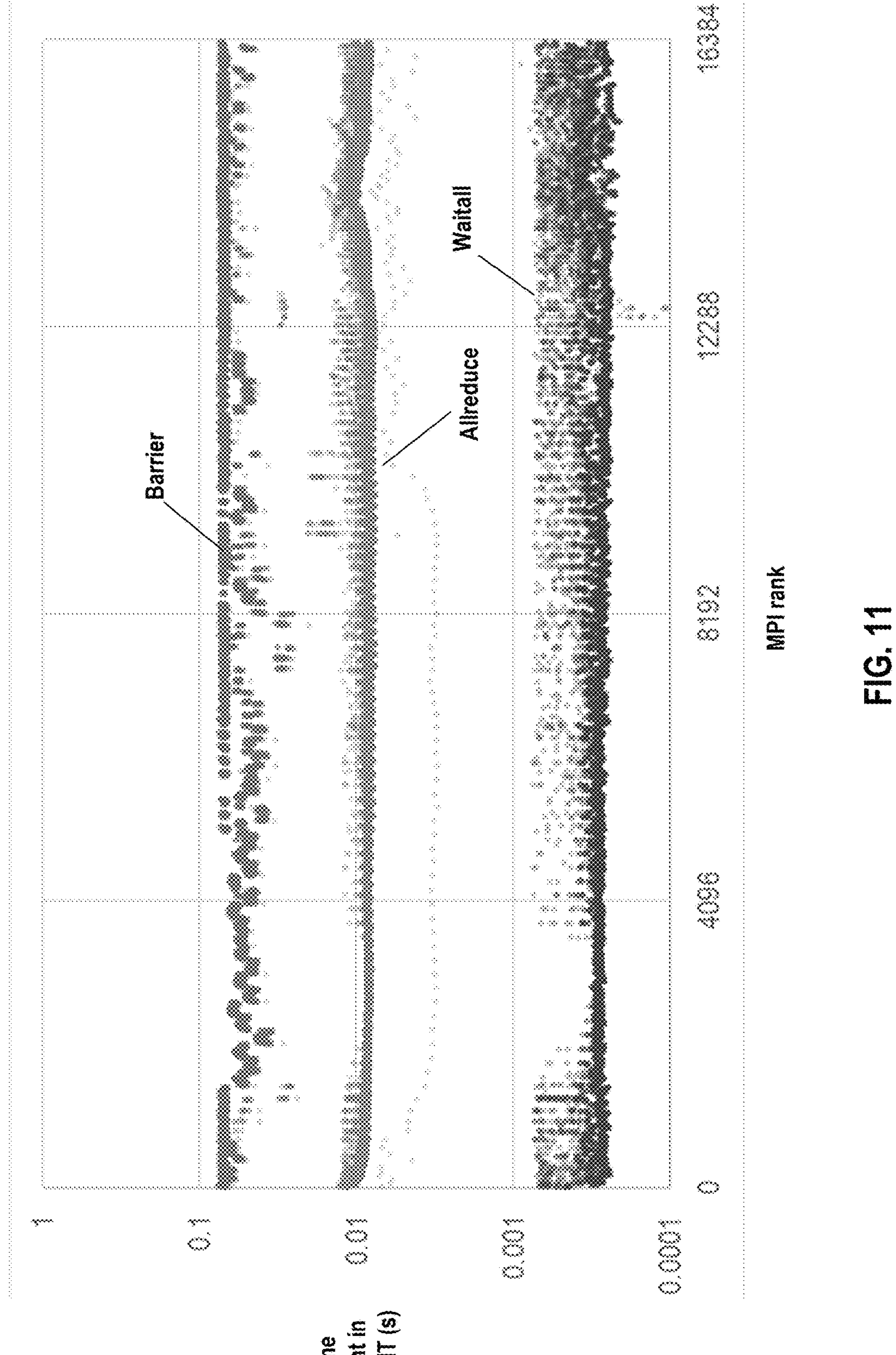
FIG. 11 depicts overhead of the AMD mwaitx instruction on an AMD EPYC 7713, for the HYCOM ocean model running on 128 nodes (16342 cores), according to embodiments of the present disclosure.

FIG. 11 depicts overhead of the AMD mwaitx instruction on an AMD EPYC 7713, for the HYCOM ocean model running on 128 nodes (16342 cores), according to embodiments of the present disclosure. The plot shows the overhead for various collective MPI functions.

4. Power Savings for Applications Experiments

In this section, the potential for an embodiment on real life HPC applications was investigated. Five of the most common workload types were tested, where each of them has a distinct communication pattern.

| Application name | Segment | Communication pattern | MPI footprint |
|---|---|---|---|
| HYCOM | Weather/Climate | Nearest neighbor | Large Allreduce |
| MOM5 | Weather/Climate | Nearest neighbor | Large Allreduce |
| OpenFOAM | Computational Fluid Dynamics | Point-to-point | Small Allreduce |
| Quantum Espresso | Materials Science | Global Transposition | Alltoall |
| CP2k | Chemistry | Global Transposition | Allreduce/ Alltoall |

Figure 12:
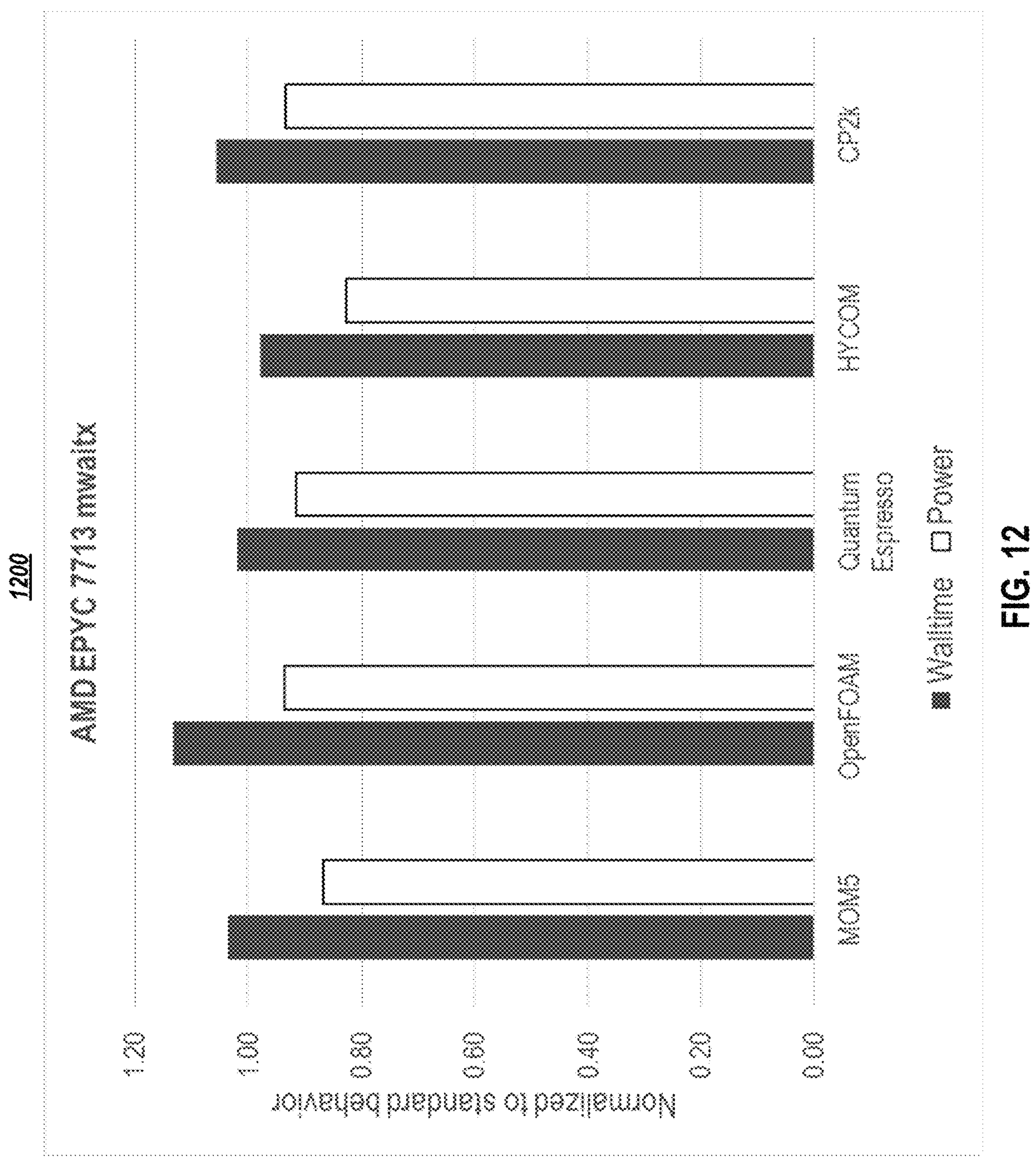
FIG. 12 depicts performance and power consumption on an AMD EPYC 7713 for popular HPC applications using the mwaitx instruction, normalized to the standard mode, according to embodiments of the present disclosure.

As discussed above, a benefit of using the umwait/mwaitx instructions may depend on the load imbalance in the application. Power savings up to 17% per CPU have been measured, mostly at the expense of a very small performance degradation. For the HYCOM ocean model, the performance improved by a few percent. FIG. 12 depicts performance and power consumption on an AMD EPYC 7713 for popular HPC applications using the mwaitx instruction, normalized to the standard mode, according to embodiments of the present disclosure. Lower is better, both for walltime (e.g., walltime often refers to the actual time taken by a program or job to execute, as opposed to the CPU time, which is the time spent executing instructions on a CPU) and power.

Figure 13:
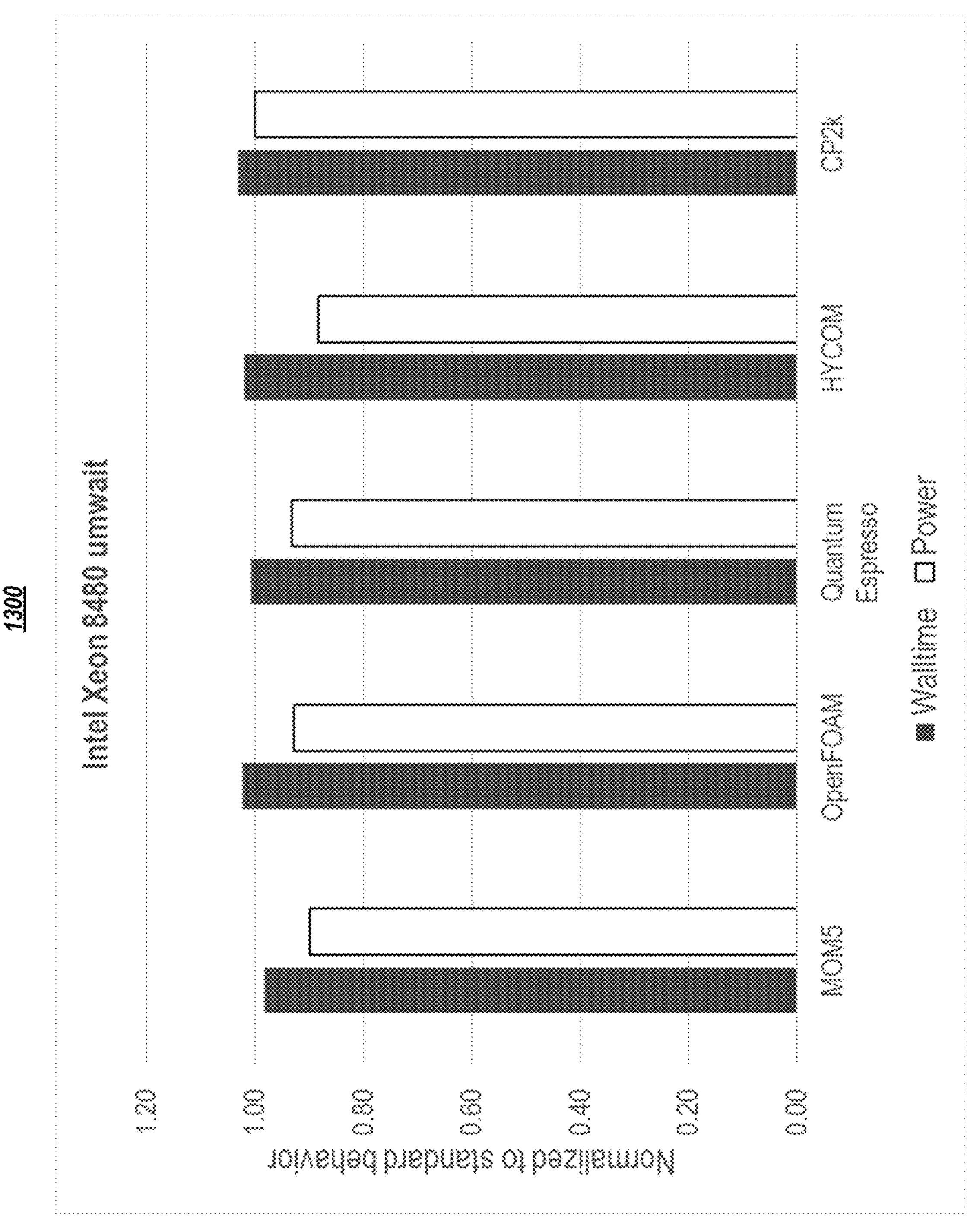
FIG. 13 depicts performance and power consumption on an Intel Xeon 8480 for popular HPC (high-performance computing) applications using the umwait instruction, normalized to the standard mode, according to embodiments of the present disclosure.

FIG. 13 depicts performance and power consumption on an Intel Xeon 8480 for popular HPC (high-performance computing) applications using the umwait instruction, normalized to the standard mode, according to embodiments of the present disclosure. Lower is better, both for walltime and power.

D. Information Handling System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 14:
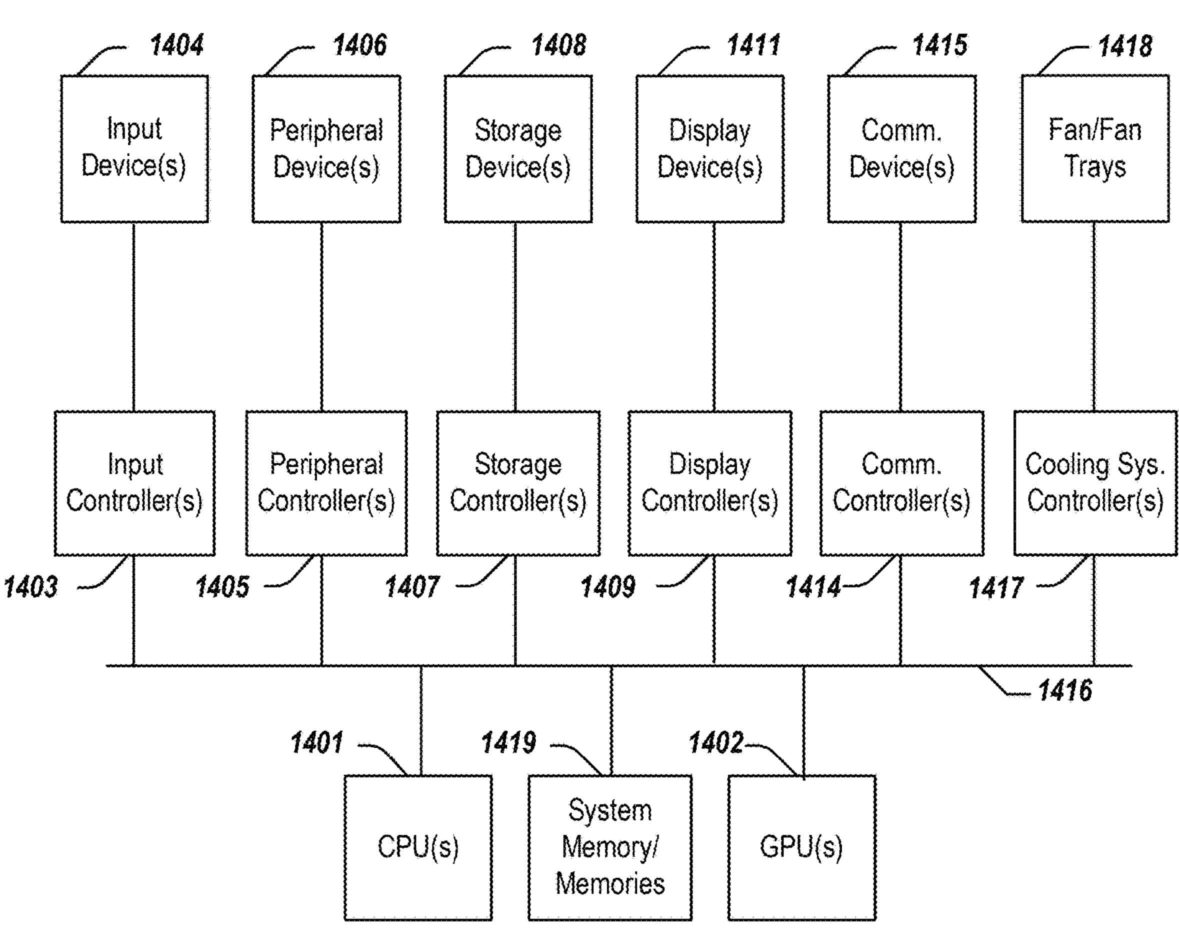
FIG. 14 depicts a simplified block diagram of an information handling system, according to embodiments of the present disclosure.

FIG. 14 depicts a simplified block diagram of an information handling system (or computing system), according to embodiments of the present disclosure. It will be understood that the functionalities shown for system 1400 may operate to support various embodiments of a computing system—although it shall be understood that a computing system may be differently configured and include different components, including having fewer or more components than depicted in FIG. 14.

As illustrated in FIG. 14, the computing system 1400 includes one or more CPUs 1401 that provide computing resources and control the computer. CPU 1401 may be implemented with a microprocessor or the like and may also include one or more graphics processing units (GPU) 1402 and/or a floating-point coprocessor for mathematical computations. In one or more embodiments, one or more GPUs 1402 may be incorporated within the display controller 1409, such as part of a graphics card or cards. In one or more embodiments, the system may alternatively or additionally include one or more data processing units (DPUs) (not shown). In the realm of data centers and cloud computing, a DPU refers to a specialized processing unit designed to accelerate data processing tasks. DPUs are typically optimized for handling data-centric workloads such as networking, storage, security, and other tasks related to data processing and manipulation. DPUs often offload specific tasks from a main CPU, allowing for improved performance, efficiency, and scalability in data-intensive applications.

They may include specialized hardware components and dedicated software to efficiently process and manage data flows within a system. The system 1400 may also include a system memory 1419, which may comprise RAM, ROM, or both.

A number of controllers and peripheral devices may also be provided, as shown in FIG. 14. An input controller 1403 represents an interface to various input device(s) 1404, such as a keyboard, mouse, touchscreen, stylus, microphone, camera, trackpad, display, etc. The computing system 1400 may also include a storage controller 1407 for interfacing with one or more storage devices 1408 each of which includes a storage medium such as magnetic tape or disk, or an optical medium that might be used to record programs of instructions for operating systems, utilities, and applications, which may include embodiments of programs that implement various aspects of the present disclosure. Storage device(s) 1408 may also be used to store processed data or data to be processed in accordance with the disclosure. The system 1400 may also include a display controller 1409 for providing an interface to a display device 1411, which may be a cathode ray tube (CRT) display, a thin film transistor (TFT) display, organic light-emitting diode, electroluminescent panel, plasma panel, or any other type of display. The computing system 1400 may also include one or more peripheral controllers or interfaces 1405 for one or more peripherals 1406. Examples of peripherals may include one or more printers, scanners, input devices, output devices, sensors, and the like. A communications controller 1414 may interface with one or more communication devices 1415, which enables the system 1400 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1400 comprises one or more fans or fan trays 1418 and a cooling subsystem controller or controllers 1417 that monitors thermal temperature(s) of the system 1400 (or components thereof) and operates the fans/fan trays 1418 to help regulate the temperature.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 15:
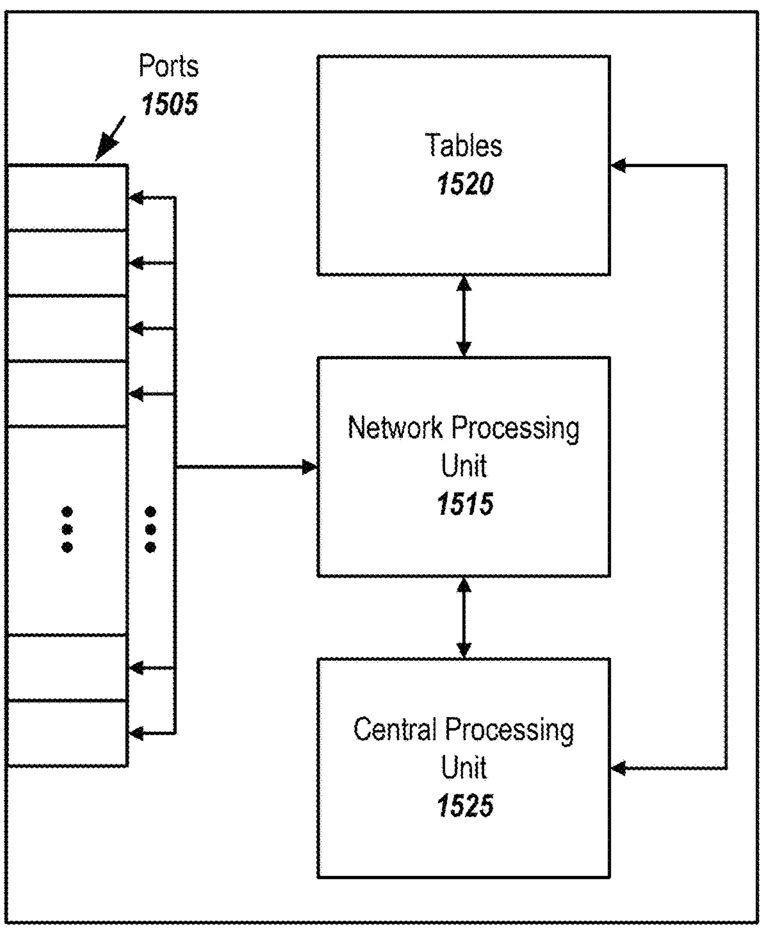
FIG. 15 depicts an alternative block diagram of an information handling system, according to embodiments of the present disclosure.

FIG. 15 depicts an alternative block diagram of an information handling system, according to embodiments of the present disclosure. It will be understood that the functionalities shown for system 1500 may operate to support various embodiments of the present disclosure—although it shall be understood that such system may be differently configured and include different components, additional components, or fewer components.

The information handling system 1500 may include a plurality of I/O ports 1505, a network processing unit (NPU) 1515, one or more tables 1520, and a CPU 1525. The system includes a power supply (not shown) and may also include other components, which are not shown for sake of simplicity.

In one or more embodiments, the I/O ports 1505 may be connected via one or more cables to one or more other network devices or clients. The network processing unit 1515 may use information included in the network data received at the node 1500, as well as information stored in the tables 1520, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media comprising one or more sequences of instructions, which, when executed by one or more processors or processing units, causes steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method comprising:

responsive to a first processing element (PE) initiating a call to perform a parallel communication with one or more other PEs:

monitoring at the first PE one or more indicators to determine whether one or more other PEs are ready to perform the parallel communication;

responsive to at least one of the one or more indicators indicating that at least one other participating PE is not ready:

clocking down a speed of the first PE to a lower state, wherein the clocking down of the speed of the first PE to the lower state makes one or more resources available, at least in part, for use by a second PE;

waiting until a threshold condition has been met; and returning to the monitoring step; and responsive to the one or more indicators indicating that the one or more other participating PEs are ready:

clocking up the speed of the first PE to a default state; and completing the parallel communication.

2. The processor-implemented method of claim 1 wherein the step of monitoring at the first PE one or more indicators to determine whether one or more other PEs are ready to perform the parallel communication comprises the first PE checking whether a value at a memory address has changed.

3. The processor-implemented method of claim 1 wherein the parallel communication is related to a collective operation.

4. The processor-implemented method of claim 1 wherein the step of waiting until a threshold condition has been met comprises:

waiting a set number of clock cycles.

5. The processor-implemented method of claim 1 wherein the step of clocking down a speed of the first PE to a lower state, wherein the clocking down of the speed of the first PE to the lower state makes one or more resources available, at least in part, for use by a second PE comprises:

making one or more resources available, at least in part, for the second PE to increase its speed to reduce its processing time for a task.

6. The processor-implemented method of claim 1 wherein the state is a c-state.

7. The processor-implemented method of claim 1 wherein the call is implemented through a software library that intercepts a standard function call and uses a custom implementation wrapping to implement the call.

8. The processor-implemented method of claim 5 wherein the first PE and the second PE are on a same system and are working on a same task or on a different task.

9. An information handling system comprising:

one or more processing elements; and a non-transitory computer-readable medium or media comprising one or more sets of instructions which, when executed by at least one of the one or more processing elements, causes steps to be performed comprising:

responsive to a first processing element (PE) of the information handling system initiating a call to perform a parallel communication with one or more other PEs:

monitoring at the first PE one or more indicators to determine whether one or more other PEs are ready to perform the parallel communication;

responsive to at least one of the one or more indicators indicating that at least one other participating PE is not ready:

clocking down a speed of the first PE to a lower state, wherein the clocking down of the speed of the first PE to the lower state makes one or more resources available, at least in part, for use by a second PE;

waiting until a threshold condition has been met; and returning to the monitoring step; and responsive to the one or more indicators indicating that the one or more other participating PEs are ready:

clocking up the speed of the first PE to a default state; and completing the parallel communication.

10. The information handling system of claim 9 wherein the step of monitoring at the first PE one or more indicators to determine whether one or more other PEs are ready to perform the parallel communication comprises the first PE checking whether a value at a memory address has changed.

11. The information handling system of claim 9 wherein the parallel communication is related to a collective operation.

12. The information handling system of claim 9 wherein the step of waiting until a threshold condition has been met comprises:

waiting a set number of clock cycles.

13. The information handling system of claim 9 wherein the step of clocking down a speed of the first PE to a lower state, wherein the clocking down of the speed of the first PE to the lower state makes one or more resources available, at least in part, for use by a second PE comprises:

making one or more resources available, at least in part, for the second PE to increase its speed to reduce its processing time for a task.

14. The information handling system of claim 9 wherein the call is implemented through a software library that intercepts a standard function call and uses a custom implementation wrapping to implement the call.

15. The information handling system of claim 13 wherein the first PE and the second PE are on a same system and are working on a same task or on a different task.

16. A non-transitory computer-readable medium or media comprising one or more sequences of instructions which, when executed by at least one processor, causes steps to be performed comprising:

responsive to a first processing element (PE) initiating a call to perform a parallel communication with one or more other PEs:

monitoring at the first PE one or more indicators to determine whether one or more other PEs are ready to perform the parallel communication;

responsive to at least one of the one or more indicators indicating that at least one other participating PE is not ready:

clocking down a speed of the first PE to a lower state, wherein the clocking down of the speed of the first PE to the lower state makes one or more resources available, at least in part, for use by a second PE;

waiting until a threshold condition has been met; and returning to the monitoring step; and responsive to the one or more indicators indicating that the one or more other participating PEs are ready:

clocking up the speed of the first PE to a default state; and completing the parallel communication.

17. The non-transitory computer-readable medium or media of claim 16 wherein the step of monitoring at the first PE one or more indicators to determine whether one or more other PEs are ready to perform the parallel communication comprises the first PE checking whether a value at a memory address has changed.

18. The non-transitory computer-readable medium or media of claim 16 wherein the step of waiting until a threshold condition has been met comprises:

waiting a set number of clock cycles.

19. The non-transitory computer-readable medium or media of claim 16 wherein the step of clocking down a speed of the first PE to a lower state, wherein the clocking down of the speed of the first PE to the lower state makes one or more resources available, at least in part, for use by a second PE comprises:

making one or more resources available, at least in part, for the second PE to increase its speed to reduce its processing time for a task.

20. The non-transitory computer-readable medium or media of claim 19 wherein the first PE and the second PE are on a same system and are working on a same task or on a different task.

* * * * *